United States Patent
Mimeault et al.

(10) Patent No.: US 11,079,473 B2
(45) Date of Patent: Aug. 3, 2021

(54) TIMING CONTROL CIRCUIT FOR GUIDED WAVE RADAR LEVEL TRANSMITTER

(71) Applicant: ABB Schweiz AG, Baden (CH)

(72) Inventors: Yvan Mimeault, Quebec (CA); Patrick Couture, Quebec (CA)

(73) Assignee: ABB Schweiz AG, Baden (CH)

(*) Notice: Subject to any disclaimer, the term of this patent is extended or adjusted under 35 U.S.C. 154(b) by 372 days.

(21) Appl. No.: 16/371,126

(22) Filed: Apr. 1, 2019

(65) Prior Publication Data

US 2020/0309901 A1   Oct. 1, 2020

(51) Int. Cl.
| | |
|---|---|
| *G01S 7/282* | (2006.01) |
| *G01F 23/284* | (2006.01) |
| *G01S 13/10* | (2006.01) |
| *G01S 13/88* | (2006.01) |
| *G01F 23/00* | (2006.01) |
| *G01S 7/02* | (2006.01) |

(52) U.S. Cl.
CPC ............ *G01S 7/282* (2013.01); *G01F 23/284* (2013.01); *G01S 13/103* (2013.01); *G01S 13/88* (2013.01); *G01F 23/0069* (2013.01); *G01S 7/02* (2013.01)

(58) Field of Classification Search
CPC .... G01F 23/284; G01F 23/0069; G01S 13/88; G01S 13/103; G01S 7/28; G01S 7/282; G01S 13/10; G01S 13/02; G01S 13/32; G01S 7/02; G01S 7/40; G01S 7/4008
USPC .......................................................... 342/124
See application file for complete search history.

(56) References Cited

U.S. PATENT DOCUMENTS

| | | | |
|---|---|---|---|
| 4,114,154 A * | 9/1978 | Sarfati | G01S 7/2921 |
| | | | 342/201 |
| 5,723,979 A | 3/1998 | Mohr | |
| 5,884,231 A | 3/1999 | Perdue et al. | |
| 5,969,666 A | 10/1999 | Burger et al. | |

(Continued)

FOREIGN PATENT DOCUMENTS

| | | |
|---|---|---|
| EP | 2071302 A2 | 6/2009 |
| EP | 2327966 A1 | 11/2009 |

OTHER PUBLICATIONS

D.A. Linkens et al., "Expert Control Systems—I. Concepts, Characteristics and Issues," Engineering Applications of Artificial Intelligence, vol. 8, No. 4, Aug. 1, 1995, pp. 413-421.

(Continued)

*Primary Examiner* — Olumide Ajibade Akonai
(74) *Attorney, Agent, or Firm* — Barnes & Thornburg LLP

(57) ABSTRACT

In at least one illustrative embodiment, a guided wave radar (GWR) level transmitter may comprise a timing circuit including a first oscillator circuit and a second oscillator circuit, a coincidence circuit configured to generate a coincidence signal indicative of phase shifts created by a difference between first and second frequencies of the first and second oscillator circuits, and a microcontroller configured to (i) determine a stretching factor based on the coincidence signal and at least one of the oscillator signals, (ii) calculate, when the stretching factor is within a first range, a distance to a media surface using the stretching factor, and (iii) adjust, when the stretching factor is outside of a second range, at least one of the first and second oscillator circuits to adjust the difference between the first and second frequencies.

20 Claims, 4 Drawing Sheets

(56) References Cited

U.S. PATENT DOCUMENTS

| | | |
|---|---|---|
| 5,973,637 A | 10/1999 | Perdue et al. |
| 6,078,280 A | 6/2000 | Perdue et al. |
| 6,087,978 A | 7/2000 | Lalla et al. |
| 6,178,817 B1 | 1/2001 | Hewelt et al. |
| 6,247,362 B1 | 6/2001 | Soroka |
| 6,295,018 B1 | 9/2001 | Diede et al. |
| 6,373,428 B1 | 4/2002 | McEwan |
| 6,559,657 B1 | 5/2003 | McCarthy et al. |
| 6,679,115 B2 | 1/2004 | Heidecke |
| 7,255,002 B2 | 8/2007 | Gravel et al. |
| 7,283,096 B2 | 10/2007 | Geisheimer et al. |
| 7,284,425 B2 | 10/2007 | Wennerberg et al. |
| 7,334,451 B1 | 2/2008 | Fauveau |
| 7,412,337 B2 | 8/2008 | Michalski et al. |
| 7,420,877 B2 | 9/2008 | Hosseini et al. |
| 7,710,125 B2 | 5/2010 | Schultheiss et al. |
| 8,022,862 B2 | 9/2011 | Larocque et al. |
| 8,044,844 B2 | 10/2011 | Nyberg |
| 8,390,348 B2 * | 3/2013 | Burcea .................. G01S 7/28 327/156 |
| 8,639,457 B2 | 1/2014 | Hammer et al. |
| 8,844,352 B2 | 9/2014 | Nilsson et al. |
| 8,963,768 B2 | 2/2015 | Kienzle et al. |
| 8,963,769 B2 | 2/2015 | Linden et al. |
| 9,593,976 B2 | 3/2017 | Nilsson et al. |
| 9,810,568 B2 | 11/2017 | Heath |
| 2002/0053238 A1 | 5/2002 | Fahrenbach et al. |
| 2002/0109626 A1 | 8/2002 | Spanke |
| 2005/0168379 A1 | 8/2005 | Griessbaum et al. |
| 2006/0225499 A1 | 10/2006 | Gravel et al. |
| 2006/0274871 A1 | 12/2006 | Griessbaum |
| 2007/0084281 A1 | 4/2007 | Fredriksson |
| 2007/0182621 A1 * | 8/2007 | Fehrenbach .......... G01S 13/103 342/124 |
| 2008/0134778 A1 | 6/2008 | Osswald et al. |
| 2009/0146867 A1 | 6/2009 | Delin et al. |
| 2012/0265486 A1 | 10/2012 | Klofer et al. |

OTHER PUBLICATIONS

European Patent Office, International Search Report and Written Opinion for related PCT/EP2020/059270, dated Jul. 2, 2020, 13 pages.

European Patent Office, International Search Report and Written Opinion for related PCT/EP2020/059263, dated Jul. 8, 2020, 15 pages.

European Patent Office, International Search Report and Written Opinion for realted PCT/EP2020/059257, dated Jun. 29, 2020, 15 pages.

* cited by examiner

TIMING CONTROL CIRCUIT FOR GUIDED WAVE RADAR LEVEL TRANSMITTER

TECHNICAL FIELD

The present disclosure relates generally to guided wave radar level transmitters and, more particularly, to timing control circuits for such level transmitters.

BACKGROUND

Guided wave radar level transmitters often use a time domain reflectometry technology based on sub-nanosecond electrical pulses transmitted along a waveguide probe at the speed of light. When pulses reach a dielectric discontinuity, part of the energy is reflected back to the transmitter and captured at a receiver, which calculates a transit time and a corresponding height or distance of media in a tank or other vessel. The level measurement is calculated based on the time between sending a transmitted signal and receiving a reflected signal.

SUMMARY

According to an aspect of the present disclosure, a guided wave radar (GWR) level transmitter may comprise a timing circuit including a first oscillator circuit and a second oscillator circuit. The first oscillator circuit may be configured to produce a first signal having a first frequency to be transmitted along a waveguide probe toward a media surface, and the second oscillator may be configured to produce a second signal having a second frequency. The GWR level transmitter may further comprise a coincidence circuit configured to produce a coincidence signal indicative of phase shifts created by a difference between the first and second frequencies. The GWR level transmitter may further comprise a microcontroller configured to (i) determine a stretching factor based on the coincidence signal and at least one of the first and second signals, (ii) calculate, in response to a determination that the stretching factor is within a first range, a distance between the media surface and a proximal end of the waveguide probe using the stretching factor, and (iii) adjust, in response to a determination that the stretching factor is outside of a second range, at least one of the first and second oscillator circuits to adjust the difference between the first and second frequencies.

In some embodiments, the first range may be larger than the second range.

In some embodiments, the GWR level transmitter may further comprise a mixing and filtering circuit configured to produce a time-translated signal by mixing the second signal with a reflected signal received from the waveguide probe in response to the first signal being transmitted along the waveguide probe. The microcontroller may be configured to calculate the distance between the media surface and the proximal end of the waveguide probe by applying the stretching factor to the time-translated signal. The mixing and filtering circuit may be configured to band pass filter a product of mixing the second signal with the reflected signal to produce the time-translated signal. The GWR level transmitter may further comprise an analog-to-digital converter configured to convert the time-translated signal into a digital signal for presentation to the microcontroller.

In some embodiments, determining the stretching factor may comprise determining a number of pulses produced by one of the first and second oscillator circuits during one period of the coincidence signal.

In some embodiments, the GWR level transmitter may further comprise a pulsor circuit configured to selectively transmit the first signal to the waveguide probe.

In some embodiments, the microcontroller may be further configured to adjust both of the first and second oscillator circuits when adjustment of only one of the first and second oscillator circuits is insufficient to bring the stretching factor within the second range.

In some embodiments, the GWR level transmitter may further comprise a voltage-controlled oscillator operable by the microcontroller to adjust at least one of (i) the first oscillator circuit to change the first frequency and (ii) the second oscillator circuit to change the second frequency, in response to a determination that the stretching factor is outside of the second range.

In some embodiments, the microcontroller may comprise a single integrated circuit configured to determine the stretching factor, determine whether the stretching factor is within the first and second ranges, calculate the distance between the media surface and the proximal end of the waveguide probe, and adjust at least one of the first and second oscillator circuits to adjust the difference between the first and second frequencies.

According to another aspect of the present disclosure, a method may comprise producing a first oscillator signal having a first frequency, producing a second oscillator signal having a second frequency, comparing the first and second oscillator signals to produce a coincidence signal indicative of phase shifts created by a difference between the first and second frequencies, transmitting the first oscillator signal along a waveguide probe toward a media surface, receiving a reflected signal from the waveguide probe in response to the first oscillator signal being transmitted along the waveguide probe, determining a stretching factor based on the coincidence signal and at least one of the first and second oscillator signals, calculating when the stretching factor is within a first range, a distance between the media surface and a proximal end of the waveguide probe using the stretching factor, and adjusting, with the processor, when the stretching factor is outside of a second range, at least one of the first and second oscillator signals to adjust the difference between the first and second frequencies. Any or all of these steps may be performed by a processor or microcontroller.

In some embodiments, the first range may be larger than the second range.

In some embodiments, the method may further comprise mixing the reflected signal with the second oscillator signal to produce a time-translated signal. Calculating the distance between the media surface and the proximal end of the waveguide probe may comprise applying the stretching factor to the time-translated signal. A product of mixing the reflected signal with the second oscillator signal may be band pass filtered to produce the time-translated signal. The method may further comprise converting the time-translated signal into a digital signal for presentation to the processor.

In some embodiments, determining the stretching factor may comprise determining a number of pulses in one of the first and second oscillator signals during one period of the coincidence signal.

In some embodiments, transmitting the first oscillator signal along the waveguide probe may comprise activating a pulsor circuit.

In some embodiments, the method may comprise adjusting both of the first and second oscillator signals when adjustment of only one of the first and second oscillator signals is insufficient to bring the stretching factor within the second range.

In some embodiments, adjusting at least one of the first and second oscillator signals to adjust the difference between the first and second frequencies may comprise using a voltage controlled oscillator to adjust the first frequency of the first oscillator signal.

In some embodiments, adjusting at least one of the first and second oscillator signals to adjust the difference between the first and second frequencies comprises using a voltage-controlled oscillator to adjust the second frequency of the second oscillator signal.

These and other features of the present disclosure will become more apparent from the following description of the illustrative embodiments.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
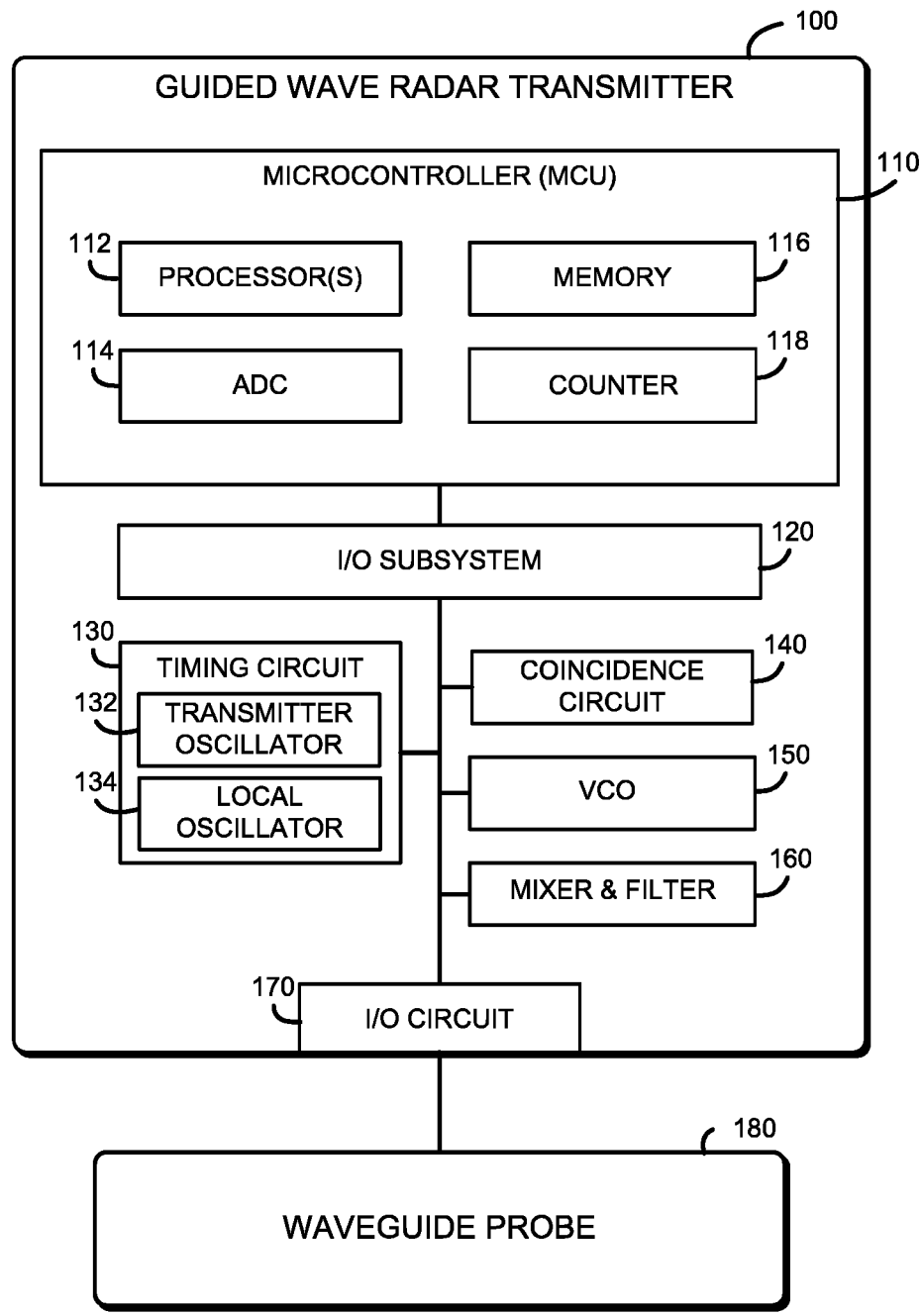
FIG. 1 is a simplified block diagram of at least one embodiment of a guided wave radar (GWR) level transmitter that includes a timing circuit.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory computer-readable storage medium, which may be read and executed by one or more processors. A computer-readable storage medium may be embodied as any storage device, mechanism, or other physical structure for storing or transmitting information in a form readable by a computing device (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
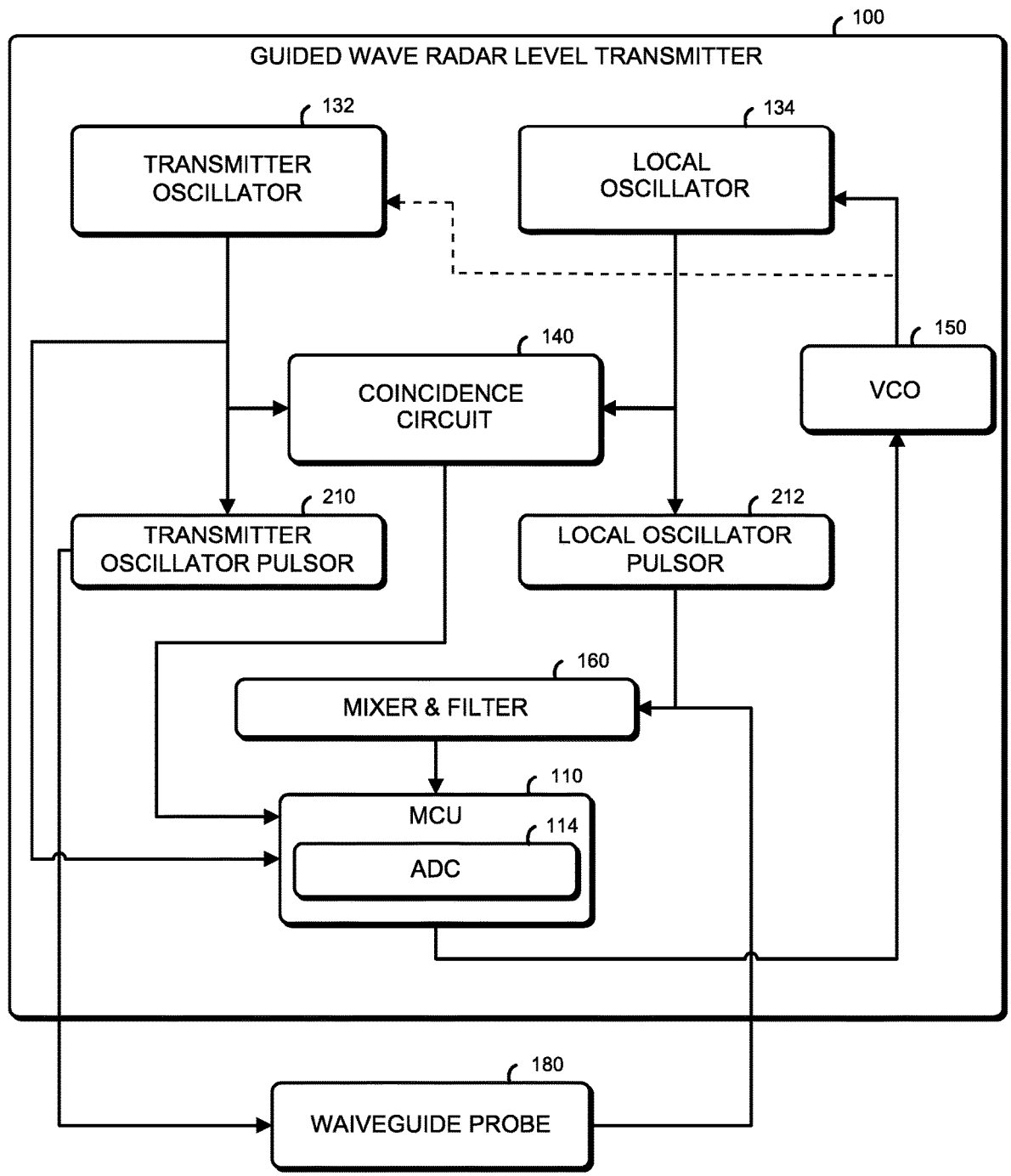
FIG. 2 is a simplified signal flow diagram of at least one embodiment of the GWR level transmitter of FIG. 1.

Referring now to FIGS. 1 and 2, an illustrative guided wave radar (GWR) level transmitter 100 includes, among other components, a microcontroller unit (MCU) 110 and a timing circuit 130. In use, the GWR level transmitter 100 may generate frequency signals using the timing circuit 130, which includes two oscillators: a transmitter oscillator 132 and a local oscillator 134. The transmitter oscillator 132 and the local oscillator 134 may use very low power or low jitter circuits with frequencies in a mega-hertz (MHz) range. In the illustrative embodiment, the transmitter oscillator 132 has a set frequency, while the local oscillator 134 has an adjustable frequency close to the frequency of the transmitter oscillator 132. It is contemplated that, in other embodiments, the local oscillator 134 may have a set frequency, while the transmitter oscillator 132 has an adjustable frequency close to the frequency of the local oscillator 134. In still other embodiments, both the transmitter oscillator 132 and the local oscillator 134 may have adjustable frequencies to allow for a broader range of frequency control. For example, in such embodiments, if adjustment of the local oscillator 134 reaches its limit, the transmitter oscillator 132 may then be adjusted for further compensation. As such, while the discussion below will generally refer to adjustment of the frequency of the local oscillator 134, it should be appreciated that these concepts are equally applicable to adjustment of the frequency of the transmitter oscillator 132.

The GWR level transmitter 100 also includes an Input/Output (I/O) circuit 170 that may include a transmitter oscillator pulsor 210 and a local oscillator pulsor 212, which may each be activated (e.g., by the MCU 110) to selectively transmit the signals from the transmitter oscillator 132 and the local oscillator 134, respectively, to other system components. For instance, using the transmitter oscillator pulsor 210, the signal from the transmitter oscillator 132 may be emitted at a predetermined pulse repetition frequency along a waveguide probe 180 and reflected when pulses reach a dielectric discontinuity (e.g., a surface of media in a tank). The reflected signal is mixed with the signal from local oscillator pulsor 212 and band pass filtered by a mixing and filtering circuit 160 of the GWR level transmitter 100. The resulting time-translated signal is acquired by an analog-to-digital converter (ADC) 114 of the MCU 110 to produce a digital signal to be used to determine a distance of the dielectric discontinuity from the proximal end of the waveguide probe 180 (i.e., the end of the waveguide probe 180 coupled to the I/O circuit 170 of the GWR level transmitter 100.

The GWR level transmitter 100 is configured to utilize a feedback control loop to allow an adjustment of the local oscillator 134 (and/or, in some embodiments, the transmitter oscillator 132) to maintain a stable range of differential frequency (Δf) between a transmitter oscillator frequency and a local oscillator frequency against any perturbation from time variation and/or the environment (e.g., variation of temperature, vibration). In the illustrative embodiment, the GWR level transmitter 100 is configured to limit a number of adjustments of the local oscillator frequency because a continuous frequency adjustment increases noise in the time translation and affects the accuracy of the distance measurement. To do so, the output signals of the two oscillators 132, 134 are sent to a coincidence circuit 140 (e.g., flip-flop circuit) to generate a coincidence signal. In the illustrative embodiment, the coincidence signal switches each time the two oscillators are equal or opposite in phase, wherein a phase shift is created by a frequency difference (Δf) between the transmitter oscillator frequency and the local oscillator frequency. It should be appreciated that this frequency difference is also sometimes referred to as a "differential frequency" in the present disclosure. As such, the frequency of the coincidence signal is equal to a differential frequency between the transmitter oscillator frequency and the local oscillator frequency ($\Delta f = f_{TX} - f_{LO}$). It will be appreciated that this differential frequency (Δf) will sometimes be positive and sometimes be negative.

The MCU 110 measures a number of pulses of the transmitter oscillator frequency during one cycle of the coincidence signal to determine a stretching factor. In the illustrative embodiment, transmitter oscillator frequency divided by differential frequency ($f_{TO}/\Delta f$) is used as the stretching factor. In other embodiments, local oscillator frequency divided by differential frequency ($f_{LO}/\Delta f$) may be used as the stretching factor. Instead of adjusting the local oscillator frequency to reach and maintain a specific set point for the time measurement compensation (time translation), the GWR level transmitter 100 of the illustrative embodiment adjusts the local oscillator frequency (and/or, in some embodiments, the transmitter oscillator 132) only if the measured stretching factor exceeds a predetermined working range. By allowing a broader drift of the local oscillator frequency, the number of frequency adjustments is decreased, which reduces noise in the time translation introduced during frequency adjustment. It should be appreciated that, by using the measured stretching factor instead of a constant stretching factor, the accuracy of the time measurement compensation may be increased, thereby increasing the accuracy of the distance measurement.

In the illustrative embodiment, the MCU 110 is communicatively coupled to other components of the GWR level transmitter 100 via the I/O subsystem 120, which may be embodied as circuitry and/or components to facilitate input/output operations with the MCU 110, the timing circuit 130, the coincidence circuit 140, a voltage-controlled oscillator (VCO) 150, the mixing/filtering circuit 160, and other components of the GWR level transmitter 100. For example, the I/O subsystem 120 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 120 may form a portion of a system-on-a-chip (SoC) and be incorporated, along with the processor 112, the memory 116, and other components, into the MCU 110.

As shown in FIG. 1, the MCU 110 includes a processor 112, an analog-to-digital converter (ADC) 114, a memory 116, and/or a counter 118. The processor 112 may be embodied as any type of processor capable of performing the functions described herein. For example, the processor 112 may be embodied as a multi-core processor(s), a microcontroller, or other processor or processing/controlling circuit. In some embodiments, the processor 112 may be embodied as, include, or be coupled to a field-programmable gate array (FPGA), an application specific integrated circuit (ASIC), reconfigurable hardware or hardware circuitry, or other specialized hardware to facilitate performance of the functions described herein. Advantageously, the functions of the present disclosure, including frequency adjustments and signal acquisition and processing, may be controlled and performed by a single MCU 110.

The analog-to-digital converter (ADC) 114 may be embodied as any circuit, device, or collection thereof, capable of converting an analog signal received from the mixing/filtering circuit 160 to a digital signal.

The memory 116 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The counter 118 may be embodied as any circuit, device, or collection thereof, capable of measuring a number of pulses of the transmitter oscillator 132 during one cycle of the coincidence signal to determine a stretching factor. It should be appreciated that, in some embodiments, the counter 118 may measure a number of pulses of the local oscillator 134 during one cycle of the coincidence signal to determine a stretching factor.

The timing circuit 130 may be embodied as any circuit, device, or collection thereof, capable of generating frequency signals. As discussed above, the timing circuit 130 includes two oscillators: the transmitter oscillator 132 and the local oscillator 134. In the illustrative embodiment, the timing circuit 130 is configured to set the transmitter oscillator 132 at predetermined frequency and to adjust the frequency of the local oscillator 134 to remain within a working range of the transmitter oscillator frequency. The timing circuit 130 is configured to be controlled by the MCU 110 to adjust the local oscillator frequency. In other embodiments, however, the timing circuit 130 may alternatively or additionally be configured to to adjust the frequency of the transmitter oscillator 132. In such embodiments, the timing circuit 130 is configured to be controlled by the MCU 110 to adjust the transmitter oscillator frequency.

The coincidence circuit 140 may be embodied as any circuit, device, or collection thereof, capable of generating a coincidence signal when the coincidence circuit 140 receives signals from the transmitter oscillator 132 and the local oscillator 134 within a time window. In the illustrative embodiment, the coincidence circuit 140 is configured to switch the coincidence signal each time the transmitter oscillator 132 and the local oscillator 134 are equal in phase or opposite in phase. In other words, a frequency of the coincidence signal is equal to the differential frequency between the transmitter oscillator frequency and the local oscillator frequency. For example, the coincidence circuit 140 may be embodied as a flip-flop circuit that switches a cycle of the coincidence when the two oscillators 132, 134 are equal in phase or opposite phase. As discussed further below, the coincidence cycle is used to determine a stretching factor.

The voltage controlled oscillator (VCO) 150 may be embodied as any circuit, device, or collection thereof, capable of controlling the frequency of the local oscillator 134 to adjust the local oscillator frequency. In embodiments in which the frequency of the transmitter oscillator 132 is adjustable, the VCO may additionally or alternatively control adjustment of the transmitter oscillator frequency (as suggested by the dashed line in FIG. 2). In some embodiments, the VCO 150 may use a varactor diode. The VCO 150 is controlled by the MCU 110 and is configured to set the local oscillator frequency near the transmitter oscillator frequency. In some embodiments, the MCU 100 may use a digital-to-analog converter (not shown) to control the VCO 150. It should be appreciated that the differential frequency ($\Delta f$) will typically be quite small compared to the transmitter oscillator frequency. For example, the transmitter oscillator frequency may be in a range of 1 to 4 MHz, whereas the differential frequency may be in the range of 5 to 40 Hz. As such, the local oscillator frequency is configured to be set close to the transmitter oscillator frequency.

The mixing/filtering circuit 160 may be embodied as any circuit, device, or collection thereof, capable of mixing the signal from local oscillator 134 with the reflected signal from the waveguide probe 180 to produce a time-translated (lower frequency) version of the reflected signal to be digitized by the ADC 114 and processed by the MCU 110.

Referring now to FIG. 2, a simplified signal flow diagram of the GWR level transmitter 100 is shown. In the illustrative embodiment, the differential frequency ($\Delta f$) between the two different oscillators is controlled by adjusting the local oscillator frequency by a feedback control loop. (As discussed above, in other embodiments, the transmitter oscillator frequency may alternatively or additionally be adjusted by the feedback control loop.) The GWR level transmitter 100 utilizes an equivalent time sampling (ETS) approach for level measurements. Pulses from the transmitter oscillator 132 are transmitted, via transmitter oscillator pulsor 210, along a waveguide probe 180 using a frequency in the MHz range and the reflected signal is mixed with pulses from the local oscillator 134, via the local oscillator pulsor 212, having a frequency that is the same as or slightly different from the pulses from the transmitter oscillator 132. Using a band pass filter at the output of mixing/filtering circuit 160, a time-translated version of the reflected signal is produced and provided to the ADC 114 of the MCU 110. This ETS approach allows the time-scale to be stretched by a stretching factor. In the illustrative embodiment, the stretching factor reflects the transmitter oscillator frequency/differential frequency ($f_{TO}/\Delta f$). In other embodiments, however, the stretching factor may reflects the local oscillator frequency/differential frequency ($f_{LO}/\Delta f$). It will be appreciated that the ETS approach allows the capture of sub-ns pulse signals and reconstructs signals at a much lower time-base, which are easier for the ADC 114 to digitize at lower sampling rate.

Additionally, the coincidence circuit 140 receives the transmitter oscillator signal (from 132) and the local oscillator signal (from 134) to generate a coincidence signal. As discussed above, the coincidence signal switches each time the two oscillators are equal in phase or opposite in phase. This coincidence signal is transmitted to the MCU 110, where it is read as digital signal.

As discussed above, the counter 118 is configured to count a number of pulses coming from the transmitter oscillator 132 (or, in some embodiments, from the local oscillator 134) during one period of the coincidence signal. The counter is started using a rising edge of the coincidence signal and, simultaneously, the output signal of mixing/filtering circuit 160 is acquired by ADC 114. At the next rising edge of the coincidence signal, the value of the pulse accumulation in the counter is stored in a register and represents the stretching factor of the last acquisition. This measured stretching factor value is used to determine the time translation of the last signal acquisition and optimizes the time measurement. It is contemplated that the value of the stretching factor may be obtained before the acquisition, after the acquisition, or by averaging the values before and after the acquisition, in various embodiments.

The MCU 110 periodically checks the stretching factor to determine if it is within one or more working ranges. Specifically, the MCU 110 will determine whether the stretching factor is within a range that will provide acceptable measurement accuracy. If so, the MCU 110 will use that stretching factor to compensate acquired measurements and calculate a distance of a media surface along the waveguide prove 180. If not (i.e., when the stretching factor is too large or too small), the acquired measurements will be discarded and not used for level determinations. Additionally, the MCU 110 will determine whether the stretching factor is outside of a range indicating that adjustment of the differential frequency ($\Delta f$) between the oscillators 132, 134 is required. If so, the MCU 110 will adjust one or both of the oscillators 132, 134 to adjust (either decrease or increase) the differential frequency ($\Delta f$) to bring it within a working range. If not (i.e., when the stretching factor indicates an acceptable difference in oscillator frequencies), no adjustment will be performed.

The ranges used by the MCU 110 in evaluating the stretching factor for measurement and for oscillator control may be the same or different. In the illustrative embodiment, the MCU 110 utilizes a larger working range when determining whether the stretching factor can be used for measurement than the working range used by the MCU 110 to determine whether frequency adjustment is needed. In other words, in the illustrative embodiment, the MCU 110 may reach three outcomes from this evaluation: (1) where the stretching factor is within both working ranges, the MCU 110 will apply it to measurements and make no adjustments to the oscillators 132, 134, (2) where the stretching factor is within the measurement working range but not the control working range, the MCU 110 will apply it to measurements and implement an adjustment to the frequency of one or both of the oscillators 132, 134 to adjust the differential frequency ($\Delta f$), and (3) where the stretching factor is outside both working ranges, the MCU 110 will discard the affected measurements and implement an adjustment to the frequency of one or both of the oscillators 132, 134 to adjust the differential frequency ($\Delta f$). These operations are further discussed below.

It will be appreciated that allowing the differential frequency ($\Delta f$) to float within a working range serves to decrease a number of feedback interventions and improve the stability of the system. Drifts in the frequencies of the oscillators 132, 134 are often very slow and constantly changing and may not require adjustments if the measured stretching factor is within the working range. As such, instead of targeting a specific stretching factor and a tight feedback control loop, the working range allows more slow drift variation of the differential frequency ($\Delta f$) and uses the measured stretching factor to compensate the time-translated measurement signals.

When the stretching factor is outside the control working range, the MCU 110 controls the VCO 150 to adjust the frequency of the local oscillator 134 (and/or the transmitter oscillator 132) to adjust the differential frequency ($\Delta f$). This adjustment may be an increase or decrease in the differential frequency (Δf) depending on the circumstances (e.g., whether the differential frequency is below or above the control working range). The adjustment to the differential frequency (Δf) is made during the second period of the coincidence signal, and no acquisition of measurement signals is made during that cycle. This allows the variation of the frequency of the local oscillator 134 caused by the adjustment to stabilize before the next signal acquisition. As such, the illustrative GWR level transmitter 100 provides a better accuracy of a distance measurement by using a real, measured stretching factor associated with a specific measurement and limits a number of frequency adjustments to decrease the noise on the frequency shift.

Figure 3:
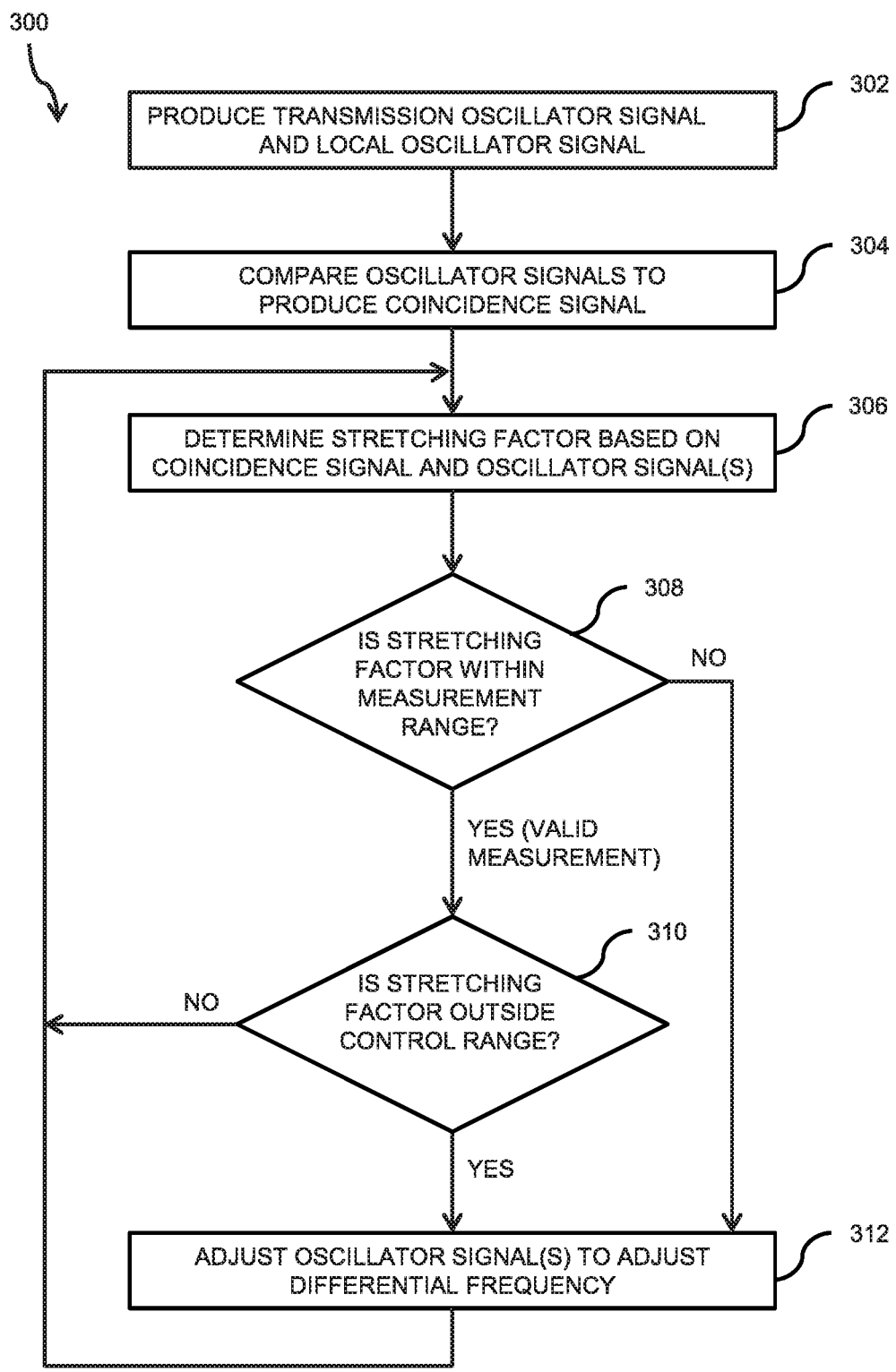
FIG. 3 is a simplified signal flow diagram of at least one embodiment of method of controlling the timing circuit of the GWR level transmitter of FIGS. 1 and 2.

Referring now to FIG. 3, in use, the GWR level transmitter 100 may execute a method 300 for controlling the local oscillator 134 (and/or the transmission oscillator 132, in some embodiments) to maintain the differential frequency (Δf) within a working range. It will be appreciated that the simplified flow diagram of FIG. 3 is illustrative in nature and that the GWR level transmitter 100 may execute other methods similar to, but different than, the method 300 for maintaining the differential frequency (Δf) within a working range. For instance, in some embodiments, the order of steps illustrated in FIG. 3 may be rearranged and/or the method may include additional or different steps than those shown.

The method 300 begins with block 302, in which the transmission oscillator 132 produces the transmission oscillator signal and the local oscillator 134 produces the local oscillator signal. As discussed above, one of the transmission and local oscillator signals may have a set frequency while the other has an adjustable frequency, or both the transmission and local oscillator signals may adjustable frequencies that are controlled by the MCU 110 (e.g., via VCO 150). In the illustrative embodiment, the transmission oscillator signal is has a set frequency, while the local oscillator signal has an adjustable frequency. Block 302 is performed continuously during operation of the GWR level transmitter 100 (i.e., the transmission oscillator 132 continually produces the transmission oscillator signal and the local oscillator 134 continually produces the local oscillator signal during operation).

In block 304, the transmission and local oscillator signals are compared by the coincidence circuit 140 to produce a coincidence signal that is indicative of phase shifts created by a difference between the frequencies of the transmission and local oscillator signals. For instance, in block 304, a flip-flop circuit 140 may switch each time the two oscillators 132, 134 are equal or opposite in phase, where a phase shift is created by a frequency difference (Δf) between the transmitter oscillator frequency and the local oscillator frequency. Like block 302, block 304 is performed continuously during operation of the GWR level transmitter 100 (i.e., the coincidence circuit 140 continually produces the coincidence signal during operation).

In block 306, the MCU 110 determines a stretching factor based on the coincidence signal produced in block 304 and at least one of the oscillator signals produced in block 302. Block 306 may be performed periodically during operation of the GWR level transmitter 100 (e.g., once during each period of the coincidence signal). As described above, in some embodiments, block 306 may involve counting a number of pulses received from the transmitter oscillator 132 during one period of a coincidence signal. Alternatively, block 306 may involve counting a number of pulses received from the local oscillator 134 during one period of a coincidence signal.

The method 300 then proceeds to block 308, in which the MCU 110 evaluates whether the stretching factor determined in block 306 is within (or outside) a working range suitable for level measurements. If the MCU 110 determines in block 308 that the stretching factor is outside this measurement working range, no level measurement is taken and the method 300 proceeds directly to block 312 in which one or both of the oscillators 132, 134 are adjusted (further discussed below). If, instead, the MCU 110 determines in block 308 that the stretching factor is within the measurement working range, a level measurement may be taken (see FIG. 4) and the method 300 proceeds to block 310. As an illustrative example, in a case where the expected value of the stretching factor was 200,000, block 308 might involve the MCU 110 checking whether the actual value of the stretching factor determined in block 306 was between 195,000 and 205,000. It will be appreciated, of course, that these numbers are merely one example and that many other values could be used.

When the method 300 proceeds to block 310, the MCU then evaluates whether the stretching factor determined in block 306 is outside (or within) a working range used for timing circuit control. If the MCU 110 determines in block 310 that the stretching factor is outside this control working range, a level measurement may be taken (see FIG. 4), and the method 300 proceeds to block 312 in which one or both of the oscillators 132, 134 are adjusted (further discussed below). If, instead, the MCU 110 determines in block 310 that the stretching factor is within the control working range, a level measurement may be taken (see FIG. 4), but no oscillator adjustments are performed, and the method 300 returns to block 306. As an illustrative example, in a case where the expected value of the stretching factor was 200,000, block 310 might involve the MCU 110 checking whether the actual value of the stretching factor determined in block 306 was between 199,000 and 201,000. It will be appreciated, of course, that these numbers are merely one example and that many other values could be used.

Based upon the determinations in block 308 and/or block 310, if the method 300 proceeds to block 312, the MCU 110 will adjust the frequency of one or both of the oscillators 132, 134 to adjust the differential frequency of the system. In block 312, the MCU 110 may cause a VCO 150 to provide a control signal to the local oscillator 134 (and/or the transmitter oscillator 134, in some embodiments) to adjust the frequency of the oscillator signal in order maintain the differential frequency within the control working range. After this adjustment in block 312 (or after block 310 if it is determined that no adjustment is needed), the method 300 returns to block 306 where the next stretching factor is determined.

Figure 4:
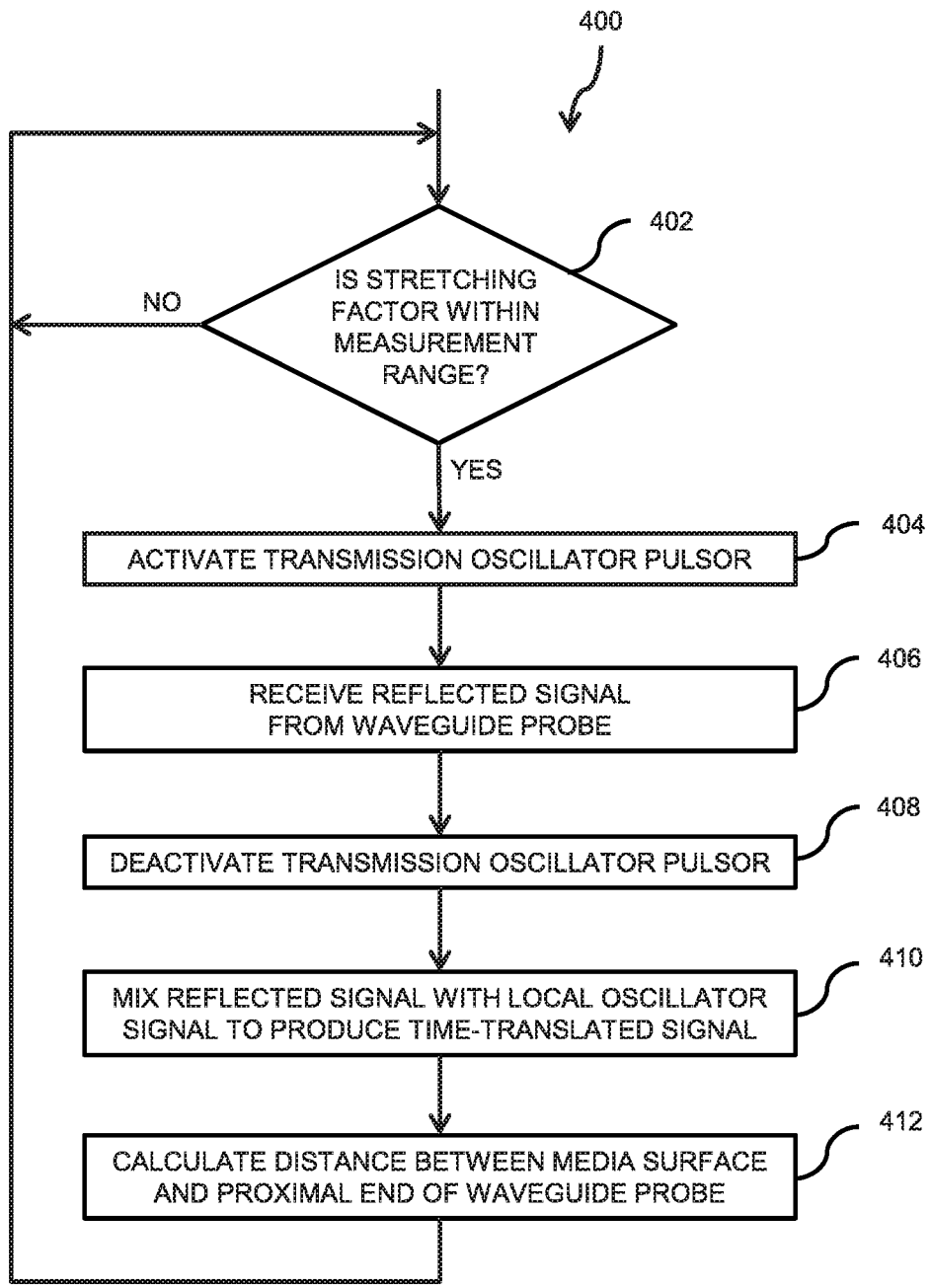
FIG. 4 is a simplified signal flow diagram of at least one embodiment of method of performing level measurements with the GWR level transmitter of FIGS. 1 and 2.

Referring now to FIG. 4, in use, the GWR level transmitter 100 may also execute a method 400 for performing level measurements. It will be appreciated that the simplified flow diagram of FIG. 4 is illustrative in nature and that the GWR level transmitter 100 may execute other methods similar to, but different than, the method 400 for maintaining performing level measurements. For instance, in some embodiments, the order of steps illustrated in FIG. 4 may be rearranged and/or the method may include additional or different steps than those shown.

The method 400 begins with block 402, which is similar to (or even overlapping with) block 308 of the method 300. In block 402, the MCU 110 evaluates whether the stretching factor determined in block 306 is within (or outside) a working range suitable for level measurements. If the MCU 110 determines in block 402 that the stretching factor is outside this measurement working range, no level measurement is taken and the method 400 awaits the determination of the next stretching factor (to then be evaluated in block 402). If, instead, the MCU 110 determines in block 402 that the stretching factor is within the measurement working range, the method 400 proceeds to block 404.

In block 404, the MCU 110 activates the transmission oscillator pulsor 210, which causes the transmission oscillator signal from the transmission oscillator 132 to be transmitted along the waveguide probe 180. In other embodiments, the transmission oscillator pulsor 210 may remain active during operation of the GWR level transmitter 100, and block 404 may be omitted from method 400. As discussed above, as the transmission oscillator signal encounters dielectric discontinuities (e.g., a surface of media in contact with the waveguide probe 180), a reflected signal will be generated in response.

The method 400 then proceeds to block 406, in which the GWR level transmitter 100 receives the reflected signal from the waveguide probe 180 (via the I/O circuit 170). Once the reflected signal has been received, the MCU 110 can deactivate the transmission oscillator pulsor 210, in block 408, to remove the transmission oscillator signal from the waveguide probe 180. In other embodiments, the transmission oscillator pulsor 210 may remain active during operation of the GWR level transmitter 100, and block 408 may be omitted from method 400

The method 400 next proceeds to block 410, in which the reflected signal received in block 406 is mixed with the local oscillator signal from the local oscillator 134 to produce a time-translated signal. Block 410 may involve filtering the mixing product using a band pass filter to produce time-translated signal.

The method 400 concludes with block 412, in which the MCU 110 calculates a distance between a media surface in contact with the waveguide probe 180 and the proximal end of the waveguide probe 180 (i.e., the end coupled to the GWR level transmitter 100). Block 412 involves the MCU 110 applying a stretching factor to compensate the time-translated signal. The stretching factor used for such compensation may be the stretching factor obtained before the acquisition (i.e., the one evaluated in block 402), a stretching factor obtained after the acquisition, an average of the stretching factors obtained before and after the acquisition, or other values.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There exist a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A guided wave radar (GWR) level transmitter comprising:
    a timing circuit including a first oscillator circuit and a second oscillator circuit, wherein the first oscillator circuit is configured to produce a first signal having a first frequency to be transmitted along a waveguide probe toward a media surface, and wherein the second oscillator is configured to produce a second signal having a second frequency;
    a coincidence circuit configured to produce a coincidence signal indicative of phase shifts created by a difference between the first and second frequencies; and
    a microcontroller configured to:
        determine a stretching factor based on the coincidence signal and at least one of the first and second signals;
        calculate, in response to a determination that the stretching factor is within a first range, a distance between the media surface and a proximal end of the waveguide probe using the stretching factor; and
        adjust, in response to a determination that the stretching factor is outside of a second range, at least one of the first and second oscillator circuits to adjust the difference between the first and second frequencies.

2. The GWR level transmitter of claim 1, wherein the first range is larger than the second range.

3. The GWR level transmitter of claim 1, further comprising a mixing and filtering circuit configured to produce a time-translated signal by mixing the second signal with a reflected signal received from the waveguide probe in response to the first signal being transmitted along the waveguide probe, wherein the microcontroller is configured to calculate the distance between the media surface and the proximal end of the waveguide probe by applying the stretching factor to the time-translated signal.

4. The GWR level transmitter of claim 3, wherein the mixing and filtering circuit is configured to band pass filter a product of mixing the second signal with the reflected signal to produce the time-translated signal.

5. The GWR level transmitter of claim 4, further comprising an analog-to-digital converter configured to convert the time-translated signal into a digital signal for presentation to the microcontroller.

6. The GWR level transmitter of claim 1, wherein to determine the stretching factor comprises to determine a number of pulses produced by one of the first and second oscillator circuits during one period of the coincidence signal.

7. The GWR level transmitter of claim 1, further comprising a pulsor circuit configured to selectively transmit the first signal to the waveguide probe.

8. The GWR level transmitter of claim 1, wherein the microcontroller is configured to adjust both of the first and second oscillator circuits when adjustment of only one of the first and second oscillator circuits is insufficient to bring the stretching factor within the second range.

9. The GWR level transmitter of claim 1, further comprising a voltage-controlled oscillator operable by the microcontroller to adjust at least one of (i) the first oscillator circuit to change the first frequency and (ii) the second oscillator circuit to change the second frequency, in response to a determination that the stretching factor is outside of the second range.

10. The GWR level transmitter of claim 1, wherein the microcontroller comprises a single integrated circuit configured to determine the stretching factor, determine whether the stretching factor is within the first and second ranges, calculate the distance between the media surface and the proximal end of the waveguide probe, and adjust at least one of the first and second oscillator circuits to adjust the difference between the first and second frequencies.

11. A method comprising:
producing a first oscillator signal having a first frequency;
producing a second oscillator signal having a second frequency;
comparing the first and second oscillator signals to produce a coincidence signal indicative of phase shifts created by a difference between the first and second frequencies;
transmitting the first oscillator signal along a waveguide probe toward a media surface;
receiving a reflected signal from the waveguide probe in response to the first oscillator signal being transmitted along the waveguide probe;
determining, with a processor, a stretching factor based on the coincidence signal and at least one of the first and second oscillator signals;
calculating, with the processor, when the stretching factor is within a first range, a distance between the media surface and a proximal end of the waveguide probe using the stretching factor; and
adjusting, with the processor, when the stretching factor is outside of a second range, at least one of the first and second oscillator signals to adjust the difference between the first and second frequencies.

12. The method of claim 11, wherein the first range is larger than the second range.

13. The method of claim 11, further comprising mixing the reflected signal with the second oscillator signal to produce a time-translated signal, wherein calculating the distance between the media surface and the proximal end of the waveguide probe comprising applying the stretching factor to the time-translated signal.

14. The method of claim 13, wherein a product of mixing the reflected signal with the second oscillator signal is band pass filtered to produce the time-translated signal.

15. The method of claim 14, further comprising converting the time-translated signal into a digital signal for presentation to the processor.

16. The method of claim 11, wherein determining the stretching factor comprises determining a number of pulses in one of the first and second oscillator signals during one period of the coincidence signal.

17. The method of claim 11, wherein transmitting the first oscillator signal along the waveguide probe comprises activating a pulsor circuit.

18. The method of claim 11, comprising adjusting both of the first and second oscillator signals when adjustment of only one of the first and second oscillator signals is insufficient to bring the stretching factor within the second range.

19. The method of claim 11, wherein adjusting at least one of the first and second oscillator signals to adjust the difference between the first and second frequencies comprises using a voltage controlled oscillator to adjust the first frequency of the first oscillator signal.

20. The method of claim 11, wherein adjusting at least one of the first and second oscillator signals to adjust the difference between the first and second frequencies comprises using a voltage-controlled oscillator to adjust the second frequency of the second oscillator signal.

* * * * *